United States Patent
Le Scouarnec et al.

(10) Patent No.: US 8,407,283 B2
(45) Date of Patent: Mar. 26, 2013

(54) DEVICE AND METHOD FOR DISSEMINATING CONTENT DATA BETWEEN PEERS IN A P2P MODE, BY USING A BIPARTITE PEER OVERLAY

(75) Inventors: Nicolas Le Scouarnec, Rennes (FR); Mary-Luc Champel, Marpire (FR)

(73) Assignee: Thomson Licensing, Issy les Moulineaux (FR)

( * ) Notice: Subject to any disclaimer, the term of this patent is extended or adjusted under 35 U.S.C. 154(b) by 114 days.

(21) Appl. No.: 12/737,295

(22) PCT Filed: Jun. 30, 2009

(86) PCT No.: PCT/EP2009/058158
§ 371 (c)(1),
(2), (4) Date: Dec. 28, 2010

(87) PCT Pub. No.: WO2010/000724
PCT Pub. Date: Jan. 7, 2010

(65) Prior Publication Data
US 2011/0161417 A1    Jun. 30, 2011

(30) Foreign Application Priority Data

Jul. 2, 2008 (EP) ..................................... 08305371
Feb. 6, 2009 (EP) ..................................... 09305109

(51) Int. Cl.
*G06F 15/16* (2006.01)
(52) U.S. Cl. ........ 709/203; 709/223; 709/242; 709/234; 709/248
(58) Field of Classification Search .................. 709/203, 709/205, 223, 231, 232, 246, 242, 243, 248
See application file for complete search history.

(56) References Cited

U.S. PATENT DOCUMENTS

| | | | |
|---|---|---|---|
| 8,010,748 B2 * | 8/2011 | Twiss et al. ................... | 711/137 |
| 8,103,777 B2 * | 1/2012 | Verhaegh et al. ............. | 709/226 |
| 8,131,971 B2 * | 3/2012 | Zuckerman et al. .......... | 711/173 |
| 8,224,968 B1 * | 7/2012 | Chen et al. .................... | 709/227 |
| 2006/0218222 A1 * | 9/2006 | Brahmbhatt et al. ......... | 709/201 |
| 2007/0025363 A1 * | 2/2007 | Zhang ........................... | 370/400 |
| 2007/0233972 A1 * | 10/2007 | Keithley et al. ............... | 711/154 |
| 2007/0244894 A1 * | 10/2007 | St. Jacques ..................... | 707/9 |
| 2007/0294422 A1 * | 12/2007 | Zuckerman et al. .......... | 709/230 |

(Continued)

OTHER PUBLICATIONS

Chan, J.S.K. et al, "Scheduling algorithms for peer-to-peer collaborative file distribution", aborative Computing: Networking, Applications and Worksharing, 2005 International Conference on Digital Object Identifier: 10.1109/COLCOM.2005.1651215 Publication Year: 2005.*

(Continued)

*Primary Examiner* — Oanh Duong
(74) *Attorney, Agent, or Firm* — Tutunjian & Bietto, P.C.

(57) ABSTRACT

A method is intended for disseminating content data in a peer-to-peer mode between peers connected to at least one communication network. This method comprises the steps of: i) making peers exchange neighboring information between them to build a bipartite peer overlay comprising a first group, comprising peers having a complete content to be disseminated, and a second group, comprising peers having not this content or only a part of it and having links therebetween, ii) disseminating the data defining the content (and preferably encoded with erasure correcting codes) from peers of the first group to first peers of the second group according to the bipartite peer overlay, iii) disseminating the data received by the first peers to other peers of the second group according to the bipartite peer overlay, and iv) updating the bipartite peer overlay when a peer of the second group has fully completed the content.

15 Claims, 1 Drawing Sheet

U.S. PATENT DOCUMENTS

| | | | |
|---|---|---|---|
| 2008/0037438 A1* | 2/2008 | Twiss et al. | 370/252 |
| 2008/0059631 A1* | 3/2008 | Bergstrom et al. | 709/224 |
| 2008/0107122 A1* | 5/2008 | Lai et al. | 370/401 |
| 2008/0155061 A1* | 6/2008 | Afergan et al. | 709/218 |
| 2008/0288580 A1 | 11/2008 | Wang et al. | |
| 2009/0037566 A1* | 2/2009 | Hoile et al. | 709/223 |
| 2009/0144412 A1* | 6/2009 | Ferguson et al. | 709/224 |
| 2009/0234967 A1* | 9/2009 | Yu et al. | 709/232 |
| 2010/0005185 A1* | 1/2010 | Liu et al. | 709/231 |
| 2010/0241708 A1* | 9/2010 | Zuckerman et al. | 709/204 |
| 2011/0087783 A1* | 4/2011 | Annapureddy et al. | 709/226 |

OTHER PUBLICATIONS

Liu Yunhao et al, "Building a Scalable Bipartite P2P Overlay Network", Parallel and Distributed Systems, IEEE Transactions on vol. 18, Issue: 9 Digital Object Identifier: 10.1109/TPDS.2007.1059 Publication Year: 2007, pp. 1296-1306.*

Igarashi, D. et al, "Overlay network topology for gossip-based multicast", Parallel and Distributed Systems, 2005, proceedings 11th International Conference, on vol. 1.*

Ganesh, A.J et al, "Peer-to-peer membership management for gossip-based protocols", Computers, IEEE Transactions on vol. 52, issue 2, Pub. 2003, pp. 139-149.*

Liu, Y. et al, "Buliding a scalaable bipartite P2P overlay network," Parallel and Distributed Processing Symposium, 2004.*

Liu, Y. et al, "Buliding a scalaable bipartite P2P overlay network," Parallel and Distributed System, IEEE Transaction on vol. 18, issue 9, pub. 2007, pp. 1296-1306.*

* cited by examiner

DEVICE AND METHOD FOR DISSEMINATING CONTENT DATA BETWEEN PEERS IN A P2P MODE, BY USING A BIPARTITE PEER OVERLAY

This application claims the benefit, under 35 U.S.C. § 365 of International Application PCT/EP2009/058158, filed Jun. 30, 2009, which was published in accordance with PCT Article 21(2) on Jan. 7, 2010 in English and which claims the benefit of European patent application No. 08305371.0, filed Jul. 2, 2008 and European patent application No. 09305109.2, filed Feb. 6, 2009.

TECHNICAL FIELD

The present invention relates to content dissemination between peers in a peer-to-peer (or "P2P") environment (or network).

One means here by "peer" a user communication equipment capable of exchanging data (or symbols) with other peers or network equipments in a P2P mode, because it comprises at least one executable P2P communication application. So, a peer may be a fixed personal computer, a laptop, a content receiver (for instance a home gateway or a set-top box (STB) located in the user's home premise), a mobile or cellular telephone, a fixed telephone, or a personal digital assistant (PDA), provided that it comprises a communication modem (or any equivalent communication means).

Moreover, one means here by "symbol" a block or packet of data.

BACKGROUND OF THE INVENTION

As it is known by the man skilled in the art, in a distributed system, such as a peer-to-peer network, some contents are disseminated between peers in order each of these peers had at its disposal these contents.

Dissemination can be performed by means of a multicast-like protocol, which uses trees, or by means of a fully decentralized and random protocol.

A (random) dissemination protocol is a protocol which needs each peer it runs to be supplied with random samples of other peers. These random samples of peers can be determined, for instance, by a gossip-based peer sampling protocol. This last protocol allows building neighborhood without a central server and is therefore suitable for frequent updates of the neighborhood.

In gossip-based peer sampling, peers periodically choose random neighbors, exchange therebetween their respective knowledges about other peers and merge their own knowledge with the one received from the other peers in order to exclude old knowledge (for instance the potentially dead peers) while minimizing the loss of information. Indeed, to avoid losing information, after a neighbor information exchange between two peers the information hold by these two peers must still be different enough. Such gossip-based peer sampling protocols produce random graphs as overlays (i.e. logical networks). More information about gossip-based peer sampling protocols can be found in the article of Spyros Voulgaris et al "Gossip-Based Peer Sampling", ACM Transaction on Computer Systems 2007, Volume 25.

Random dissemination protocols can be classified into pull protocols and push protocols.

When a pull protocol is implemented, peers have to require to their neighbors missing parts of contents. So this type of dissemination protocol requires bi-directional channels between peers and an important control overhead. One of the main pull protocols used for disseminating contents is the Bittorrent protocol. In Bittorrent, a content is cut in blocks or chunks, and all peers cooperate in a reciprocal manner so that each peer gets all the chunks of this content. This technique is often referred as "content swarming".

Pull protocols, like Bittorrent, do not suffer from a data overhead, but they induce an important control overhead. Moreover, the resulting disseminations have slow startups and high delays. Therefore, they are not suitable for low delay dissemination.

When a push protocol is implemented, a peer which receives a block or chunk of a content randomly selects F neighbors and forwards them this received chunk. Each chunk has a lifetime, which is the number of hop a chunk may undergo and which is decreased each time it is forwarded from a peer to another peer. When the lifetime becomes zero, the chunk is no more forwarded. Push protocols ensure a fast startup. They do not need feedback channel and have a low control overhead.

Push protocols are mainly controlled by two parameters: the "fanout", which is the number of random peers to which a block or chunk is forwarded, and the lifetime. The delay is highly influenced by the fanout, and the degree of completion (i.e. how many peers got a complete content) is influenced by the product of the fanout and the lifetime. The higher this product is, the higher the overhead of data will be. One means here by "data overhead" data received by a peer more than one time.

Push protocols work quite well when a full content completion is not needed. Indeed, the last peers may be hard to reach (even if an encoding with forward erasure correcting (FEC) codes is used), and therefore the lifetime and fanout must be increased, which increases the data overhead.

More information about push protocols can be found in the article of Patrick T. Eugster et al "From Epidemics to Distributed Computing", IEEE Computer, Volume 37, 2004.

A third type of dissemination protocols can be also implemented. It comprises the push-pull protocols. In this third type of protocols, push phases are followed by pull phases. A peer that missed some parts of a content during a push phase will request the missing parts of this content during following pull phase(s). Information about available content blocks being attached to content data, the control overhead is low.

These push-pull protocols have low delay and low control overhead since the low delay is ensured by the push phase and completion is ensured by the pull phase(s). So, increasing fanout or lifetime is not needed. Moreover, a full content dissemination near every peer does not induce an increase of the data overhead. The main drawback of these push-pull protocols is their non easy implementation because they are more complex and that their parameters are more difficult to adjust (and especially the one defining when we are in a push mode or in a pull mode).

More information about push-pull protocols can be found in the article of Sujay Sanghavi et al "Gossiping with multiple messages", IEEE International Conference on Computer Communications, 2007 (INFOCOMM 2007).

SUMMARY OF THE INVENTION

So the object of this invention is to improve content dissemination by means of a new dissemination protocol.

For this purpose, the invention provides a method, intended for disseminating content data in a peer-to-peer mode between peers connected to at least one communication network, and comprising the steps of:

i) making peers exchange neighboring information between them to build a bipartite peer overlay comprising a first group, comprising peers having a complete content to be disseminated, and a second group, comprising peers having not said content or only a part of it and having links therebetween (preferably random links), ii) disseminating the data defining this content from peers of the first group to first peers of the second group, according to the bipartite peer overlay, iii) disseminating the data received by these first peers to other peers of the second group according to the bipartite peer overlay, and iv) updating the bipartite peer overlay when a peer of the second group has fully completed the content.

The method according to the invention may include additional characteristics considered separately or combined, and notably:

in step(s) i) and/or iv) one may build and/or update the bipartite peer overlay by means of a gossip-based peer sampling protocol (slightly) modified to take into account first and second peer states depending respectively of their belonging to the first group or second group;

in step(s) i) and/or iv) when a peer receives a message containing neighboring information from another peer, it may merge this neighboring information with its own neighboring information by removing each duplicate peer and each first group peer and at least one of the oldest known peers and/or at least one of the most recently known peers and/or at least one peer chosen randomly, in order to update the bipartite peer overlay (and therefore its knowledge of its neighbors);

in step iii) one may disseminate the received content data from peers to peers a chosen number of time (defined by a lifetime);

in step iii) one may disseminate the received content data from peers to peers by means of a dissemination protocol which is chosen from a protocol group comprising push dissemination protocols and push-pull dissemination protocols;

in step ii) peers of the first group may disseminate the data of the content to second group peers that are randomly chosen;

in a first variant, in step ii) peers of the first group may disseminate the data of the content to peers of the second group chosen according to at least one criterion;

in a second variant, in step ii) peers of the first group may disseminate the data of the content to second group peers that are neighboring peers;

in step ii) peers of the first group may disseminate the data of the content after having encoded these data with erasure correcting codes.

The invention also provides a device, intended for controlling dissemination by a peer, connected to a communication network, of content data, in a peer-to-peer mode, to other peers, and comprising:

a first means arranged for participating to building of a bipartite peer overlay, comprising a first group, comprising peers having a complete content to be disseminated, and a second group, comprising peers having not this content or only a part of it and having links therebetween (preferably random links), from neighboring information exchanged by its peer with other peers, and a second means arranged for ordering to its peer to disseminate data, defining at least partly a content, to peers of the second group according to the bipartite peer overlay, the first means being further arranged for updating the bipartite peer overlay (and therefore its knowledge of its neighbors) when a peer of the second group has fully completed the content.

The system according to the invention may include additional characteristics considered separately or combined, and notably:

its first means may be arranged, when its peer has received a message containing neighboring information from another peer, for merging this neighboring information with its own neighboring information by removing each duplicate peer and each first group peer and at least one of the oldest known peers and/or at least one of the most recently known peers and/or at least one peer chosen randomly, in order to update the bipartite peer overlay (and therefore its knowledge of its neighbors);

its second means may be arranged for ordering to its peer to disseminate a received content data to other peers by means of a dissemination protocol chosen from a protocol group comprising push dissemination protocols and push-pull dissemination protocols;

its second means may be arranged for determining randomly into the second group peers toward which its peer must disseminate data of a content;

in a first variant its second means may be arranged for determining into the second group, according to at least one criterion, peers toward which its peer must disseminate data of a content;

in a second variant its second means may be arranged for determining into the second group peers that are neighbors of its peer and toward which its peer must disseminate data of a content.

BRIEF DESCRIPTION OF THE FIGURES

Other features and advantages of the invention will become apparent on examining the detailed specifications hereafter and the appended drawings, wherein.

DETAILED DESCRIPTION OF THE PREFERRED EMBODIMENT

The appended drawings may serve not only to complete the invention, but also to contribute to its definition, if need be.

The invention aims at offering a process, and an associated control device (D), intended for allowing dissemination of content data in a peer-to-peer (P2P) mode between peers (Pj) connected to at least one communication network (CN).

In the following description it will be considered that the communication network (CN) is a wired (or fixed) network, such as a DSL network or an optical fiber network or else a cable network. But the invention is not limited to this type of communication network. Indeed, the communication network may be also a wireless communication network, such as a mobile or cellular or else radio communication network.

Moreover, in the following description it will be considered that peers (Pj) are user communication equipments, such as fixed personal computers. But the invention is not limited to this type of communication equipment. Indeed, the invention concerns any type of communication equipment comprising at least one executable P2P communication application and capable of exchanging data (or symbols) with other communication equipments (or peers) or network equipments in a P2P mode. So, a peer may be also a laptop, a content receiver (for instance a home gateway or a set-top box (STB) located in the user's home premise), a mobile or cellular telephone, a fixed telephone, or a personal digital assistant (PDA), provided that it comprises a communication modem (or any equivalent communication means).

More, in the following description it will be considered that the contents to be disseminated are files of information data. But the invention is not limited to this type of content. Indeed, the invention concerns any type of content which can be used only if it has been completed, and notably video, television programs, radio programs and software updates.

Figure 1:
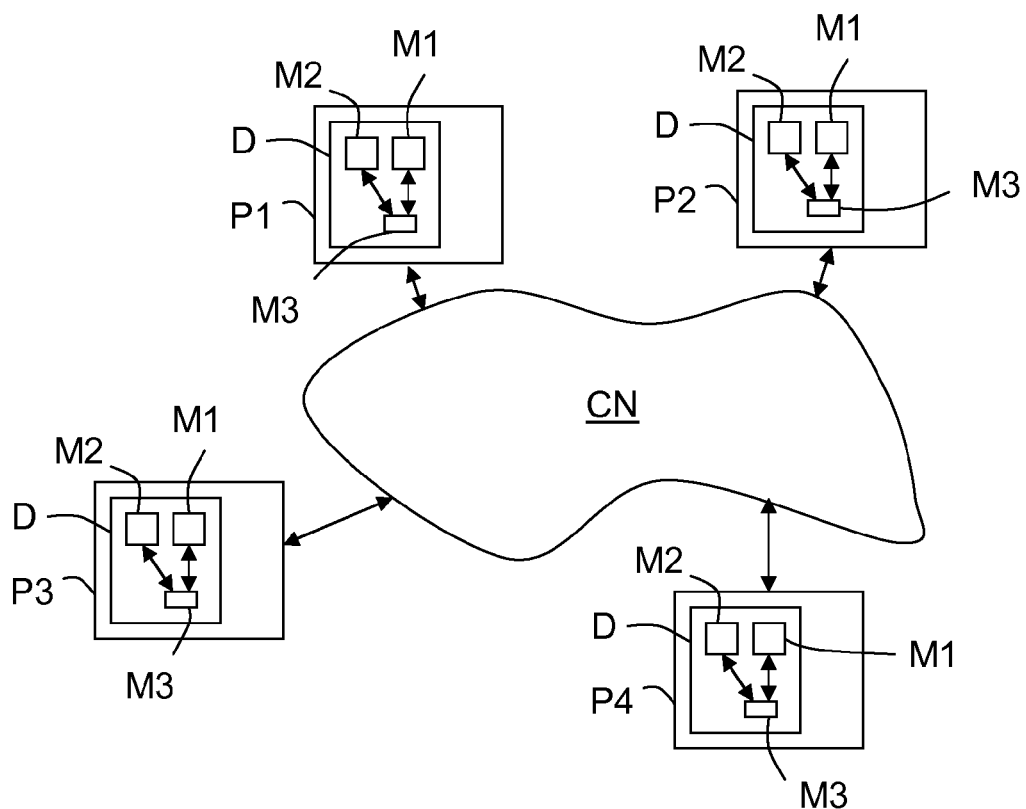
FIG. 1 schematically and functionally illustrates four peers connected to a communication network and each comprising an example of embodiment of a device according to the invention, and FIG. 2 schematically illustrates a very simple example of bipartite peer overlay comprising a first group of 6 peers and a second group of 9 peers (it is recalled that some overlays may comprise hundreds or even thousands of peers).

As it is schematically illustrated in FIG. 1, the invention concerns a group of peers Pj (here j=1 to 4) which are connected therebetween through a communication network CN. In this non limiting example the group comprises four peers (P1-P4), but it could comprise three peers or more peers than four (this is notably the case in the non limiting example illustrated in FIG. 2 where it comprises fifteen peers (j=1 to 15)), and possibly hundreds or thousands of peers.

The invention proposes a method intended for disseminating content data in a peer-to-peer (P2P) mode between peers Pj. This dissemination method comprises four main steps and can be implemented by control devices D according to the invention which are associated respectively to the peers Pj.

One means here by "associated" the fact that a control device D equips a peer Pj (as illustrated in FIG. 1). But in a variant it could also mean coupled (for instance connected) to a peer Pj.

As illustrated, a control device D comprises at least a first means (or module) M1 and a second means (or module) M2.

A first main step (i) of the method according to the invention consists in making peers Pj exchange neighboring information between them in order to build a bipartite peer overlay. One means here by "bipartite peer overlay" an overlay (or logical network) comprising a first group G1, comprising peers Pj having a complete content that must be fully disseminated, and a second group G2, comprising peers Pj' having not yet received this content or having only received a part of this content and having links therebetween (and preferably random links).

The bipartite peer overlay can be seen as a combination of a random graph and a bipartite graph. This results in a split graph, which is a graph with a fully connected component (random part—peers of the second group G2) and isolated peers around it (bipartite part—peers of the first group G1). Only peers of the second group G2 have incoming edges. Peers of the first group G1 are not known by any other peers.

Figure 2:
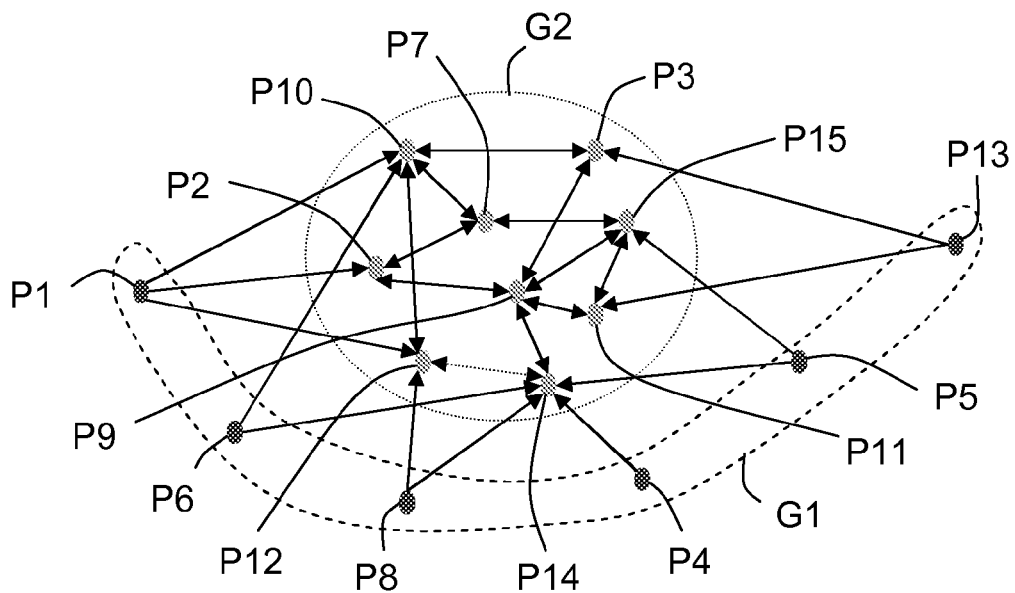

In the non limiting example illustrated in FIG. 2, the first group G1 comprises six peers (P1, P4, P5, P6, P8 and P13) at a given instant, and the second group G2 comprises nine peers (P2, P3, P7, P9, P10, P11, P12, P14 and P15) at the same given instant.

The bipartite peer overlay can be built by the first means M1 of the control devices D of the peers Pj from neighboring information obtained by these peers Pj through exchanges with other peers Pj'. For instance these exchanges can be carried out by the peers Pj by means of a gossip-based peer sampling protocol which is (slightly) modified in order to take into account first and second peer states depending respectively of their belonging to the first group G1 or second group G2. In fact, each peer Pj collects neighboring information from its neighbors Pj' and then constitutes its own part of the bipartite peer overlay, and this is the merging of all these parts which constitutes the bipartite peer overlay.

For instance the protocol has a periodic task that chooses a random neighbor of a peer Pj and sends a message with information about local knowledge of the network. When a peer Pj receives such a message from another peer Pj', the content of this message is merged with the local neighboring information (or knowledge) of peer Pj. For instance this merging consists in removing each duplicate peer and each first group peer and at least one of the oldest known peers and/or at least one of the most recently known peers and/or at least one peer chosen randomly. For instance one may remove the H oldest peers, with H=2 or 3 (for instance), so that the overlay has a self-healing property, then one may remove the S first peers, with S=4 or 5 (for instance), because one may consider that they are probably already known from some peers. This minimizes the loss of information. Some peers can be randomly removed in order the number of peers contained in a part of a bipartite peer overlay remains constant for every peer Pj.

The part of a bipartite peer overlay which concerns specifically a peer Pj can be stored into a storing means M3 of its associated control device D (as illustrated in FIG. 1). This storing means M3 can be of any type known by the man skilled in the art. So, it can be a memory, for instance. This part may comprise, for instance, the identifiers of each peer Pj' to which a peer Pj is connected and which therefore constitutes one of the neighbors of this peer Pj.

It is important to note that the bipartite peer overlay could be also built by a central server, connected to the communication network CN, from the neighboring information transmitted by each peer Pj. In this case one does not use a gossip-based peer sampling protocol, and this is the central server which provides any peer Pj with its own part of the bipartite peer overlay (also called "peer view" or "neighborhood"— i.e. the smallest subset of peers that a peer has to know).

A second main step (ii) of the method according to the invention consists in disseminating, according to the bipartite peer overlay, the data that must be fully disseminated from peers Pj of the first group G1 to first peers Pj' of the second group G2. In the non limiting example illustrated in FIG. 2, the first peers of the second group G2 are P2, P3, P10, P11, P12, P14 and P15.

Each peer Pj of the first group G1 can choose the first peers of the second group G2 to which it will have to transmit the content data (for dissemination purpose), according to its specific part of the bipartite peer overlay, for instance.

Such a choice can be done randomly amongst every peers of the second group G2, or according to one or more criteria (for instance a proximity criterion or a completion criterion (for instance at least one of the first peers is a known peer which already possesses the most complete content (but not the full content), even if it is not a neighbor of a first group peer in the bipartite peer overlay)), or else among every peers of the second group G2 that it considers as neighbors. This allows some peers to complete quickly a content and then to become quickly a peer of the first group G1.

The first peers of the second group G2, to which a first group peer must transmit content data, are determined (or chosen) by the second means M2 of its associated control device D.

This second means M2 is further arranged, once it has determined first peers, for ordering to its associated peer Pj (if it belongs to the first group G1) to disseminate the content data to these first peers, according to its own part of the bipartite peer overlay (for instance stored into the storing means M3). For this purpose, the second means M2 can provide to its associated peer Pj the identifiers of the chosen first peers in order it could transmit the content data it possesses to these first peers.

Preferably, in step ii) peers of the first group G1 disseminate the content data after having encoded them. This encoding can be performed by means of rateless erasure correcting codes or low rate erasure correcting codes, for instance, in order to avoid redundancy between content data pushed by different peers.

When a first peer receives content data (or a symbol) from a first group peer it may add them (it) to a dedicated local buffer it comprises. If a received content data (or symbol) is the last missing content data (or symbol), the content is complete and the first peer becomes a peer of the first group G1. When a content data (or symbol) is added to a buffer, if this buffer is full, the oldest content data (or symbol) is preferably removed.

The dissemination protocol used by a first group peer for disseminating content data toward first peers is a regular push protocol.

A third main step (iii) of the method according to the invention consists in disseminating the data received by the first peers to other peers of the second group G2 according to the bipartite peer overlay, then, if necessary, from these other peers to still other peers of the second group G2. The number of hop (between peers Pj, Pj') content data may undergo is defined by the lifetime of these content data.

The peers (neighbors) of the second group G2, to which a second group peer Pj must transmit content data, are determined (or chosen) by the second means M2 of its associated control device D. It is important to note that the peer determination (or choice) which is carried out by a second means M2 may vary according to the group (G1, G2) to which belongs its associated peer Pj temporarily.

It is also important to note that each second group peer having received content data transmits the full content of its buffer to the peers (neighbors) of the second group G2 determined (or chosen) by the second means M2 of its associated control device D. Each time a content data is disseminated from a second group peer to other second group peers it decreases the lifetime of this content data.

It is also important to note that if in step ii) peers of the first group G1 disseminate the content data after having encoded them, then in step iii) peers of the second group G2 disseminate the received encoded content data.

The dissemination protocol used by a second group peer for disseminating the received content data toward other second group peers can be a regular push protocol. But it can be also a push/pull protocol.

A fourth main step (iv) of the method according to the invention consists in updating the bipartite peer overlay when a peer of the second group G2 has fully completed a concerned content. Indeed, in this situation the peer can not be considered anymore as a member of the second group G2, but as a new member of the first group G1.

This updating is automatically performed by the first means M1 of a peer Pj when the latter has fully completed a content to be disseminated. This first means M1 updates the part of the bipartite peer overlay of its peer Pj (stored into the storing means M3), and its peer Pj must inform the other peers Pj' of its change of state (from G2 to G1). This information can be done by the peer Pj by means of the gossip-based peer sampling protocol (slightly) modified according to the invention (i.e. to take into account first and second peer states depending respectively of their belonging to the first group G1 or second group G2).

In case where the bipartite peer overlay is built by a central server, the latter also proceeds to updating of the bipartite peer overlay each time it is informed by a peer Pj of its change of state (i.e. from G2 to G1).

The control device D (and notably its first means M1 and second means M2) is preferably made of software modules, at least partly. But it could be also made of electronic circuit(s) or hardware modules, or a combination of hardware and software modules (in this case the control device D comprises also a software interface allowing interworking between the hardware and software modules). In case where it is exclusively made of software modules it can be stored in a memory of the network equipment CS or in any computer software product.

The invention offers low delay and low overhead dissemination. Moreover, by making peers unequal, the available resources are used optimally as some peers will be able to re-encode data quickly.

The invention is not limited to the embodiments of dissemination method, control device and peer described above, only as examples, but it encompasses all alternative embodiments which may be considered by one skilled in the art within the scope of the claims hereafter.

The invention claimed is:

1. Method for disseminating content data in a peer-to-peer mode between peers connected to at least one communication network, comprising the steps of:
  i) making peers exchange neighboring information between them to build a bipartite peer overlay wherein the bipartite overlay comprises: a first group comprising peers having a complete content to be disseminated, and a second group comprising peers having no said content or only a part of said content, said peers of the second group having links therebetween,
  ii) disseminating the data defining said content from peers of the first group to first peers of the second group according to said bipartite peer overlay,
  iii) disseminating the data received by said first peers to other peers of said second group according to said bipartite peer overlay, and
  iv) updating said bipartite peer overlay when a peer of said second group has fully completed said content.

2. Method according to claim 1, wherein in step(s) i) and/or iv) one builds and/or one updates said bipartite peer overlay by means of a gossip-based peer sampling protocol modified to take into account first and second peer states depending respectively of their belonging to the first group or second group.

3. Method according to claim 2, wherein in step(s) i) and/or iv), when a peer receives a message containing neighboring information from another peer, said peer merges the neighboring information of the another peer with its own neighboring information by removing each duplicate peer and each first group peer and at least one of the oldest known peers and/or at least one of the most recently known peers and/or at least one peer chosen randomly, in order to update said bipartite peer overlay.

4. Method according to claim 1, wherein in step iii) one disseminates the received content data from peers to peers a chosen number of time.

5. Method according to claim 1, wherein in step iii) one disseminates the received content data from peers to peers by means of a dissemination protocol chosen from a protocol group comprising push dissemination protocols and push-pull dissemination protocols.

6. Method according to claim 1, wherein in step ii) peers of said first group disseminate the data of said content to second group peers that are randomly chosen.

7. Method according to claim 1, wherein in step ii) peers of said first group disseminate the data of said content to peers of said second group chosen according to at least one criterion.

8. Method according to claim 1, wherein in step ii) peers of said first group disseminate the data of said content to second group peers that are neighboring peers.

9. Method according to claim 1, wherein in step ii) peers of said first group disseminate the data of said content after having encoded said data with erasure correcting codes.

10. Device for controlling dissemination of content data, in a peer-to-peer mode, from a peer associated to said device connected to a communication network, to other peers, comprising i) a first means arranged for participating to building of a bipartite peer overlay, wherein the bipartite overlay comprises: a first group comprising peers having a complete content to be disseminated, and a second group comprising peers having no said content or only a part of said content, said peers of the second group having links therebetween, from neighboring information exchanged by the peer associated to said device with other peers, and ii) a second means arranged for ordering the peer associated to said device to disseminate said content data to peers of the second group according to said bipartite peer overlay, said first means being further arranged for updating said bipartite peer overlay when a peer of said second group has fully completed said content.

11. Device according to claim 10, wherein said first means is arranged, when the peer associated to said device has received a message containing neighboring information from another peer, for merging this neighboring information with its own neighboring information by removing each duplicate peer and each first group peer and at least one of the oldest known peers and/or at least one of the most recently known peers and/or at least one peer chosen randomly, in order to update said bipartite peer overlay.

12. Device according to claim 10, wherein said second means is arranged for ordering to the peer associated to said device to disseminate a received content data to other peers by means of a dissemination protocol chosen from a protocol group comprising push dissemination protocols and push-pull dissemination protocols.

13. Device according to claim 10, wherein said second means is arranged for determining randomly into said second group peers to which the peer associated to said device must disseminate data of a content.

14. Device according to claim 10, wherein said second means is arranged for determining into said second group, according to at least one criterion, peers toward which the peer associated to said device must disseminate data of a content.

15. Device according to claim 10, wherein said second means is arranged for determining into said second group peers that are neighbors of the peer associated to said device and toward which its peer must disseminate data of a content.

* * * * *